United States Patent
Wüest

(10) Patent No.: US 11,164,731 B2
(45) Date of Patent: Nov. 2, 2021

(54) IONIZATION VACUUM MEASURING CELL

(71) Applicant: INFICON AG, Balzers (LI)

(72) Inventor: Martin Wüest, Malans (CH)

(73) Assignee: INFICON AG, Balzers (LI)

( * ) Notice: Subject to any disclaimer, the term of this patent is extended or adjusted under 35 U.S.C. 154(b) by 110 days.

(21) Appl. No.: 15/762,927

(22) PCT Filed: Sep. 23, 2015

(86) PCT No.: PCT/EP2015/071846
§ 371 (c)(1),
(2) Date: Aug. 20, 2018

(87) PCT Pub. No.: WO2017/050361
PCT Pub. Date: Mar. 30, 2017

(65) Prior Publication Data
US 2019/0043702 A1 Feb. 7, 2019

(51) Int. Cl.
*G01L 21/30* (2006.01)
*G01L 21/34* (2006.01)
(Continued)

(52) U.S. Cl.
CPC ............. *H01J 41/06* (2013.01); *G01L 21/34* (2013.01); *H01J 2237/18* (2013.01); *H01J 2237/31701* (2013.01)

(58) Field of Classification Search
CPC .......... H01J 41/06; G01L 21/30; G01L 21/31; G01L 21/34; G01N 27/62; G01N 27/60; G01N 27/66; G01N 27/68; G01N 27/70
See application file for complete search history.

(56) References Cited

U.S. PATENT DOCUMENTS 3,505,554 A * 4/1970 Vekshinsky ............. H01J 41/06
313/157
3,555,411 A * 1/1971 Woods .................... H01J 41/06
324/463
(Continued)

FOREIGN PATENT DOCUMENTS

DE 830819 C 2/1952
DE 939173 C 2/1956
(Continued)

OTHER PUBLICATIONS

International Search Report and Written Opinion for realated PCT Application No. PCT/EP2015/071846; 13 pages. English translation for ISR provided.
(Continued)

*Primary Examiner* — Neel D Shah
(74) *Attorney, Agent, or Firm* — Procopio, Cory, Hargreaves & Savitch LLP

(57) ABSTRACT

The invention relates to an ionization vacuum measuring cell (10) comprising an evacuable housing (12) with a measurement connection for a vacuum to be measured at an end portion; a measurement chamber (14) in the housing (12), said measurement chamber being fluidically connected to the measurement connection, wherein the measurement chamber (14) is designed as a replaceable component; and a first and a second electrode (16, 18) in the measurement chamber (14), said electrodes being substantially coaxial to an axis and being arranged at a distance from each other. The measuring cell further comprises an electrically insulating and vacuum-tight feedthrough (20) for an electric supply to the second electrode (18) and a magnetization assembly which is designed to generate a magnetic field in the ionization chamber. According to the invention, the mea-
(Continued)

surement chamber (14), in particular at least one of the electrodes (16, 18), comprises a magnetic material.

18 Claims, 1 Drawing Sheet

(51) Int. Cl.
*G01N 27/60* (2006.01)
*G01N 27/62* (2021.01)
*G01N 27/66* (2006.01)
*G01N 27/68* (2006.01)
*G01N 27/70* (2006.01)
*H01J 41/06* (2006.01)

(56) References Cited

U.S. PATENT DOCUMENTS

| | | | | |
|---|---|---|---|---|
| 5,198,772 A * | 3/1993 | Peacock | ............ | H01J 41/06 |
| | | | | 250/382 |
| 5,317,270 A * | 5/1994 | Lethbridge | ............ | G01L 21/34 |
| | | | | 313/247 |
| 8,350,572 B2 * | 1/2013 | Watanabe | ............ | C23C 14/564 |
| | | | | 324/459 |
| 10,455,683 B2 * | 10/2019 | Denning | ............ | H01J 41/12 |
| 2003/0165617 A1 * | 9/2003 | Kagadei | ............ | H05H 3/02 |
| | | | | 427/248.1 |
| 2007/0170926 A1 * | 7/2007 | Vesel | ............ | G01N 21/34 |
| | | | | 324/460 |
| 2008/0100301 A1 | 5/2008 | Knott | | |
| 2010/0259273 A1 * | 10/2010 | Kawasaki | ............ | G01L 21/34 |
| | | | | 324/460 |
| 2013/0154658 A1 | 6/2013 | Shinada et al. | | |
| 2014/0176150 A1 * | 6/2014 | Andreaus | ............ | G01L 21/30 |
| | | | | 324/463 |
| 2016/0025587 A1 * | 1/2016 | Andreaus | ............ | H01J 41/06 |
| | | | | 324/463 |
| 2017/0315012 A1 * | 11/2017 | Swinney | ............ | H01J 41/06 |

FOREIGN PATENT DOCUMENTS

EP 0516422 A2 12/1992
WO 2014/135229 A1 9/2014

OTHER PUBLICATIONS

International Preliminary Report on Patentability for PCT App No. PCT/EP2015/071846 dated Mar. 29, 2018, 6 pgs.
Search Report for related EP App No. 19182074.5 dated Sep. 27, 2019, 8 pgs.

* cited by examiner

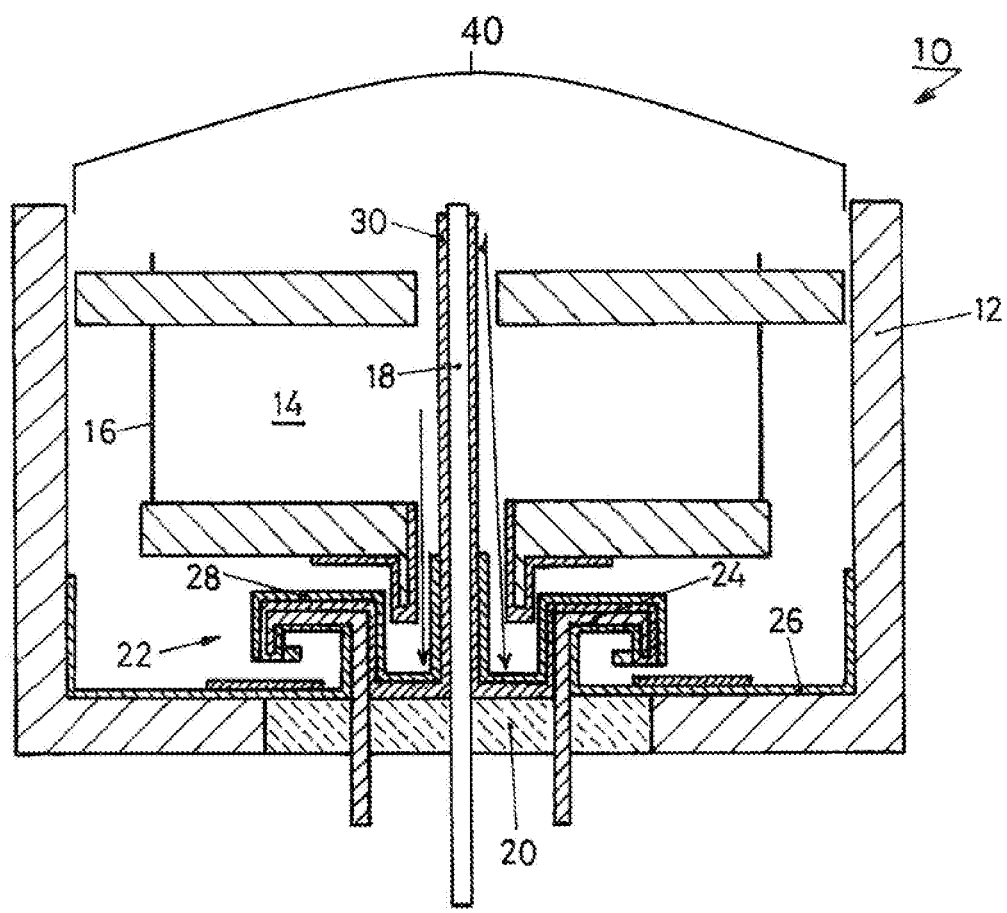

IONIZATION VACUUM MEASURING CELL

CROSS-REFERENCE TO RELATED APPLICATIONS

This application is a U.S. National Stage entry of PCT Application No: PCT/EP2015/071846 filed Sep. 23, 2016, the contents of which are incorporated herein by reference.

The present invention relates to an ionization vacuum gauge.

Vacuum pressure measurements with cold cathodes, which are based on the principle of a gas discharge with a cold cathode, are known. These devices apply a high electric field between the anode and the cathode, resulting in a plasma discharge. In it residual gas particles are ionized. In order to ensure that the electrons have a longer residence time in the sensor, a magnetic field is applied at right angles to the electric field. In this magnetic field the electrons gyrate and have a higher probability of collision with the residual gas, which increases the sensitivity. Because of the crossed magnetic field and electric field, this class of sensors is also referred to in recent literature as E×B sensors to distinguish them from the field emitters, which are also cold.

When the high voltage is switched on, an electric field is applied. A first gas particle is spontaneously ionized by cosmic radiation. The resulting ion flies against the cathode. When hitting the cathode secondary electrons are knocked out, which are pulled by the electric field in the direction of the anode. In the magnetic field, the electrons are forced on circular paths and can make impacts with a residual gas atom and ionize it.

Finally, the electrons strike the positively charged anode. The measured anode current is a function of the pressure and serves as a measurement signal for the pressure.

In the prior art, the sensor housing and the ionization chamber are made of non-magnetic material (e.g. stainless steel AISI 316) in order to avoid affecting the magnetic field generated by the external magnet. The magnetic field inside the measuring chamber of an inverted magnetron should extend as axially as possible and be homogeneous. Field inhomogeneities or non-axial magnetic fields lead to sensitivity losses of the sensor and to hysteresis effects.

An ionization vacuum measuring cell comprises a housing having a measuring connection for the vacuum to be measured at an end portion of the housing. The measuring connection is formed by at least one opening in the end portion of the housing, through which opening the ambient vacuum atmosphere to be measured extends into the housing. Further, a measuring chamber is included, which is receivable in the housing. Here, the measuring chamber is in fluid communication with the measuring port. This connection is such that the pressure in the measuring chamber is adjusted to this pressure to be measured virtually instantaneously when the pressure to be measured in the ambient atmosphere changes.

The pressure to be measured in this case is the pressure directly at the measuring port.

In the measuring chamber, a first and a second electrode are provided. These electrodes are formed substantially coaxially with respect to an axis and are spaced from each other. Between these two electrodes, an ionization space is formed in the measuring chamber, in which, upon the application of a corresponding electric potential difference between the electrodes, the gas is ionized. The first of the electrodes has a substantially cylindrical inner surface as an electrode surface facing the ionization space. The second electrode is formed in a rod-shaped manner and lies on the axis with respect to the cylindrical inner surface or extends along its axis.

Both an electrically insulating and also vacuum-tight feedthrough is provided as an electrical supply to at least one of the electrodes. Also included is an electrical insulator which electrically isolates portions of the ionization vacuum measuring cell whose electrical potential is different from that of the supply or electrode being made.

Cold cathodes are generally very robust in operation, since, in contrast to hot ionization gauge, no filament can break, which then makes the measurement impossible.

Cold cathode sensors, however, have disadvantages. One disadvantage is the formation of flakes. Flakes are chipped particle pieces. These particle pieces can bridge the distance between the pole disk and the anode rod and cause a short circuit, whereby pressure measurement is no longer possible and the measuring cell has to be replaced. The flakes are formed by sputtering of the cathode material and by re-deposition on points in the sensor that are less affected by sputtering. In this case, a thin film is formed over time, e.g. on the pole disk. Over time, the thin film stress of the deposited layer becomes too large and thin film chips flake off. The flaking of the layer is promoted by thermal changes (e.g. switching on/off) or by turbulent gas flows (e.g. venting). Flaking problems are particularly serious in the semiconductor industry, since aggressive gases are used there (e.g. halogens). The halogens can chemically attack the material used. The plasma excites the ions to excited states, which are chemically even more aggressive. The sputtering effect causes the cathode in particular to be rapidly atomized.

In summary, the surfaces of the measuring chamber, which are exposed to the ionization space, are particularly affected in the form of deposits, which requires their repeated cleaning. This can result in long downtimes of the ionization vacuum measuring cell.

It is therefore proposed in the prior art to design the measuring chamber as an exchangeable component in order to keep the ionization vacuum measuring cell operational for a relatively long time. Such a measuring chamber is known from WO 2014/135229 A1. The disadvantage remains that the measuring chamber is replaced very frequently. For example, the life of an inverted magnetron in an implanter application is only a few days until the sensor fails with errors and incorrect pressure readings and the measuring chamber must be replaced. This results in long downtimes and overall high costs.

It is an object of the present invention to provide an ionization vacuum measuring cell in which the disadvantages of the prior art are solved.

According to the invention, this object is achieved by an ionization vacuum measuring cell, which comprises: a) an evacuable housing with a measuring connection for a vacuum to be measured at one end section; b) a measuring chamber in the housing, which is in fluid communication with the measuring connection, wherein the measuring chamber is preferably designed as an exchangeable component; b) a first and a second electrode in the measuring chamber, which are arranged substantially coaxially with respect to an axis and spaced from each other, whereby between these two electrodes an ionization space is formed in the measuring chamber, wherein the first electrode preferably has a substantially cylindrical surface and the second electrode is preferably formed in a rod-shaped manner and lies on the axis; c) an electrically insulating and vacuum-tight feedthrough for an electrical supply to the second electrode, comprising an electrical insulator, wherein the second electrode is sealingly passed through this insulator; and d) a magnetization arrangement which is designed to generate a magnetic field in the ionization space. The ionization vacuum measuring cell is characterized in that the measuring chamber comprises magnetic material and in that the first electrode and/or the second electrode either consists/consist of magnetic material or is/are coated with the magnetic material.

The use of magnetic material as a material for the measuring chamber is so far completely unknown. Until now, the opinion prevailed that the measuring chamber should be kept free of magnetic material, since magnetic material influences the orbital motion of the charged particles. The use of magnetic materials has heretofore been rejected in the art because these materials reduce the magnetic field strength in the sensor and alter the sensor characteristics. According to the invention, in an entirely surprising way, an ionization vacuum measuring cell is provided which continues to generate reliable measurement results and the measuring chamber has a much longer life compared to the prior art.

Also, the prior art refrained from using nickel as the material for the measuring chamber because nickel has a higher sputter yield than previously used materials such as stainless steel. The sputter yield of nickel is 1.5 (knocked out) atoms per ion striking. Thus, in the prior art, the use of nickel as a material for the measuring chamber was not an issue at all.

The use of a magnetic material according to the invention, such as nickel, as a material for the measuring chamber contributes in a completely surprising and crucial manner to the increase of the life of the measuring chamber. Nickel generates magnetic flakes, which are advantageously retained on the at least one magnetic pole disk encompassed in the measuring chamber and thus fly around much less freely within the measuring chamber. Another advantage of using nickel as the material for the measuring chamber is that nickel has a high resistance to chemically aggressive fluids. For example, nickel is inert to fluorine.

In the prior art, everything spoke against the use of magnetic materials up until now, in particular of nickel as the material for the measuring chamber. Completely surprisingly, it has been found according to the invention that the lifetime of the measuring chamber is increased by a factor of 2.5 compared with the prior art through the use of nickel as the material for the measuring chamber. It proves to be particularly advantageous in this case that the produced flakes, which are magnetic due to the use of nickel as a material for the measuring chamber, are held by the magnetic pole discs within the ionization space much more reliably on its surface than non-magnetic flakes. According to the invention, therefore, far fewer flakes reach places of the ionization vacuum measuring cell at which the flakes could cause leakage currents or short circuits.

In addition to nickel, cobalt is also ideal as a magnetic material. Cobalt has a sputter yield of 1.3 (knocked out atoms per ion striking.

In addition to the above-mentioned pure or almost pure magnetic materials, magnetic alloys are used as magnetic material in further embodiment variants. It has been shown that at least 45% nickel, preferably at least 49% nickel, and/or at least 45% cobalt, preferably at least 49% cobalt, are present.

Furthermore, it has been found that the following materials are suitable as magnetic material according to the invention:

Permalloy (70 to 80% Ni, approx. 20% Fe, possibly with small amounts of Mo and Cu);
Perminvar (45% Ni, 30% Fe, 25 Co);
NIMONIC (approx. 80% Ni, 20% Cr);
Radiometal 4550 (45% Ni, 55% Fe);
AlNiCo.

In further embodiment variants of the present invention, the measuring chamber is inserted into the housing on the measuring connection side and releasably locked to the housing. As a result, the measuring chamber is advantageously removable and can be installed in the housing of the ionization vacuum measuring cell in a quick and reliable manner.

In further embodiment variants of the present invention, the ionization vacuum measuring cell further comprises a locking member, which acts axially or radially between the housing and the measuring chamber, for releasable attachment between the housing and the measuring chamber inserted therein.

In further embodiment variants of the present invention, the locking member comprises a screw connection, a snap hook connection or a snap ring. Thus, the measuring chamber can be inserted quickly and reliably for abutment on the measuring connection side into the housing of the ionization vacuum measuring cell and can be releasably locked on the housing.

In further embodiment variants of the present invention, the magnetization arrangement is arranged radially outside the measuring chamber and designed to generate a magnetic field whose magnetic field lines within the ionization space extend substantially parallel to the axis thereof. In this case, the term magnetization arrangement is an arrangement of permanent magnets with passive magnetic field guiding members such as yokes, pole pieces, shunts, which include, for example, ferromagnetic materials. However, the term magnetization arrangement also includes an arrangement of permanent magnets without passive magnetic field guiding members.

In further embodiments of the vacuum measuring cell according to the invention, there is further provided a shield disposed upstream in an ionization gas direction of the vacuum-tight feedthrough. This shield serves in particular to protect the vacuum-tight feedthrough against sputtered particles from the measuring chamber. It is expressly pointed out that this embodiment variant does not necessarily have to include a measuring chamber made of nickel or with nickel. Accordingly, a protection of the shield is reserved regardless of a nickel-containing measuring chamber.

In further embodiments of the present invention, the shield is disposed within the housing such that a substantial portion of the vacuum-tight feedthrough is shielded. Thus, the vacuum-tight feedthrough is reliably protected and its life and thus the life of the measuring chamber are significantly extended.

In still further embodiment variants of the present invention, the shield comprises a baffle, which is formed substantially for deflecting particles generated in the measuring chamber. The term particles can be understood here to mean the above-mentioned flakes or flaked particles from the measuring chamber as well as particles produced by the ionization, for example electrons and atoms. The baffle may be formed as a cantilevered cylindrical metal plate, which extends coaxially to the longitudinal axis of the measuring chamber.

In further embodiment variants of the present invention, the shield is disposed in a section between the measuring chamber and the housing and is formed as a labyrinth path.

As a result, the vacuum-tight feedthrough is further reliably protected, since, for example, atoms produced by the ionization collide on their way through the labyrinth path several times on wall sections of the shield, where they are deposited with high probability before they reach the vacuum-tight feedthrough. The shield can be understood as a cantilevered component with side edges, wherein the labyrinth path drastically reduces the likelihood of particles passing directly to the vacuum-tight feedthrough. The particles hit the wall sections of the shield several times and thus lose much speed and therefore energy. As a result, the contamination of the vacuum-tight feedthrough is significantly reduced and delayed.

In a further embodiment variant of the present invention, the shield comprises at least sections of ceramic. By using ceramic for the shield, the vacuum-tight feedthrough is further reliably protected against contamination.

It is expressly understood that the above embodiment variants are arbitrarily combinable. Only those combinations of embodiment variants are excluded which would lead to contradictions by the combination.

In the following, the present invention will be explained with reference to exemplary embodiments shown in the drawing, wherein:

FIG. 1 shows a schematic sectional view of an ionization vacuum measuring cell in an enlarged view in the region of the vacuum-tight feedthrough.

FIG. 1 shows an ionization vacuum measuring cell 10 in a schematic longitudinal sectional view along the axial direction. The ionization vacuum measuring cell 10 comprises an evacuable housing 12 with a measuring connection (not shown) for a vacuum to be measured at an end portion 40. In the housing 12, a measuring chamber 14 is inserted, which is in fluid communication with the measuring connection. The measuring chamber 14 is designed in this case, for example, as an exchangeable component and is inserted, for example, on the measuring connection side into the housing 12 and is releasably locked thereto.

The measuring chamber 14 comprises a first electrode 16 and a second electrode 18. The first electrode 16 is cylindrical and has a cylindrical inner surface. The second electrode 18 is rod-shaped. Both electrodes 16, 18 are arranged coaxially spaced from each other with respect to the longitudinal axis of the ionization vacuum measuring cell 10. As a result, an ionization space is formed within the measuring chamber 14 between these two electrodes 16, 18. The first electrode 16 acts as a cathode, while the second electrode 18 acts as an anode. Between these two electrodes 16, 18, a sufficiently high DC voltage is applied, whereby a gas discharge is ignited and maintained. The discharge current forms a measure of the pressure to be measured.

The ionization vacuum measuring cell 10 further comprises an electrically insulating and vacuum-tight feedthrough 20 to the second electrode 18 (anode). The vacuum-tight feedthrough 20 includes an electrical insulator, such as glass. The vacuum-tight feedthrough 20 may be formed as a glass ring, which is melted. The second electrode 18 protrudes sealingly through this insulator. Thus, the vacuum-tight feedthrough 20 electrically reliably insulates the second electrode 18 against the housing 12. It should be noted that, in operation, the second electrode may be set to an electrical potential of +3.3 kV, while the housing is essentially grounded (0V). The feedthrough 20 in the anode region should be able to withstand up to 5 kV.

Furthermore, the ionization vacuum measuring cell 10 comprises a magnetization arrangement, which is omitted in FIG. 1 for reasons of clarity. The magnetization arrangement serves to generate a magnetic field in the ionization space of the measuring chamber 14. This magnetic field carries the electrons on their way from the first electrode 16 (cathode) to the second electrode 18 (anode) on spiral tracks, whereby the path of the electrons is extended. As a result, the probability of hitting the gas particles is increased, thus improving the overall degree of ionization. It is thus ensured that the discharge takes place over wide pressure ranges and behaves stably and reproducibly.

In the prior art, a non-magnetic material has hitherto been used as material for the measuring chamber 14, for example stainless steel AISI 316, so that the magnetic field inside the ionization space is not essentially affected. According to the invention, it is now proposed that the material of the measuring chamber comprises nickel. It has been found in accordance with the invention that the ferromagnetic material nickel contributes significantly to the fact that, in relation to the prior art, flakes are much less likely to reach areas and settle where the flakes could cause leakage currents or short circuits. By using nickel as the material of the first electrode 16 included in the measuring chamber 14, the (magnetic) flakes are advantageously held on the surfaces of the magnetic pole disks of the measuring chamber 14. Thus the flakes do not interfere with the operation of the ionization vacuum measuring cell 10. This is not the case with flakes resulting from stainless steel as material for the measuring chamber, as used in the prior art.

A further embodiment variant of the ionization vacuum measuring cell 10 further comprises a shield 22. In this regard, it is expressly pointed out that this further embodiment variant does not necessarily have to include a measuring chamber made of nickel. It is conceivable in particular that the measuring chamber can consist of a different material, i.e. that it does not comprise any nickel in particular.

The shield 22 according to the invention is now, as viewed in the ionization gas direction, upstream of the vacuum-tight feedthrough 20. Here, the shield 22 is arranged and formed such that a substantial portion of the vacuum-tight feedthrough 20 is shielded. The shield 22 comprises a protruding or collar-shaped ceramic element 24, which may be cylindrical and is arranged substantially coaxially with respect to the first and second electrodes 16, 18. The cylindrical ceramic element 24 also passes in a sealing manner through the vacuum-tight feedthrough 20. Overall, the cylindrical ceramic element 24 reliably surrounds the second electrode 18 in the region of the lower housing section of the ionization vacuum measuring cell 10. Thus, an overall good insulation against voltage breakdown between the second electrode 18 and the housing 12 is created by the ionization vacuum measuring cell 10.

The ceramic element 24 includes, for example, aluminum oxide ($AlO_2$). The high dielectric strength and maximum operating temperature of up to 1900° C. make aluminum oxide the ideal insulator. The lower portion of the housing 12 is internally provided with an insulating layer 26 deposited by ALD (Atomic Layer Deposition). By way of illustration, thin-layered contaminations 28 are indicated by way of example within the ionization vacuum measuring cell 10. As can be seen, a substantial area below the shield 22 is free of contaminations 28, as the labyrinth path realized by the shield 22 makes it more difficult for particles to reach the underside and thus the vacuum-tight feedthrough 20. Optionally, the outer side of the rod-shaped second electrode 18 may be provided with a coating 30, which is resistant to plasma etching. Thus, the electrode is reliably protected. According to a further embodiment variant of the present invention, it is therefore conceivable that only the rod-shaped second electrode 18 consists of a preferably inert, plasma-resistant material (e.g. Hastelloy C-22: Ni with 22% Cr, 13% Mo, 3% W, 3% Fe), therefore is not necessarily made of a magnetic material.

The invention claimed is:

1. Ionization vacuum measuring cell (10), comprising:
   a) an evacuable housing (12) having a measuring connection for a vacuum to be measured at an end portion;
   b) a measuring chamber (14) in the housing (12), which is in fluid communication with the measuring connection, wherein the measuring chamber (14) is preferably designed as an exchangeable component;
   c) a first and a second electrode (16, 18) in the measuring chamber (14), which are arranged substantially coaxially with respect to an axis and spaced from each other, whereby an ionization space is formed in the measuring chamber (14) between these two electrodes (16, 18), wherein the first electrode (16) acts as a cathode and preferably has a substantially cylindrical surface and the second electrode (18) acts as an anode and is preferably rod-shaped and lies on the axis;
   d) an electrically insulating and vacuum-tight feedthrough (20) for electrical supply to the second electrode (18), comprising an electrical insulator, wherein the second electrode (18) is passed through said insulator in a sealing manner; and
   e) a magnetization arrangement which is designed to generate a magnetic field in the ionization space, characterized in that the measuring chamber (14) comprises magnetic material and that the first electrode (16) and/or the second electrode (18) either consists/consist of magnetic material or is/are coated with the magnetic material, wherein the magnetic material of the measuring chamber, of the first electrode, and of the second electrode each substantially extends parallel to said axis, wherein the magnetization arrangement is arranged radially outside the measuring chamber (14) and is designed to generate a magnetic field whose magnetic field lines within the ionization space extend substantially parallel to the axis thereof.

2. Ionization vacuum measuring cell (10) according to claim 1, wherein the magnetic material comprises at least one of the following materials:
   nickel;
   cobalt;
   at least 45% nickel, preferably at least 49% nickel, and/or at least 45% cobalt, preferably at least 49% cobalt;
   Permalloy (70 to 80% Ni, approx. 20% Fe, especially with small amounts of Mo and Cu);
   Perminvar (45% Ni, 30% Fe, 25% Co);
   NIMONIC (approx. 80% Ni, 20% Cr);
   Radiometal 4550 (45% Ni, 55% Fe);
   AlNiCo.

3. Ionization vacuum measuring cell (10) according to claim 2, wherein the measuring chamber (14) is inserted on the measuring connection side into the housing (12) and is releasably locked to the housing (12).

4. An ionization vacuum measuring cell (10) according to claim 2, further comprising a locking member which acts axially or radially between the housing (12) and the measuring chamber (14) for releasable attachment between the housing (12) and the measuring chamber (14) inserted therein.

5. Ionization vacuum measuring cell (10) according to claim 1, wherein the measuring chamber (14) is inserted on the measuring connection side into the housing (12) and is releasably locked to the housing (12).

6. An ionization vacuum measuring cell (10) according to claim 5, further comprising a locking member which acts axially or radially between the housing (12) and the measuring chamber (14) for releasable attachment between the housing (12) and the measuring chamber (14) inserted therein.

7. An ionization vacuum measuring cell (10) according to claim 1, further comprising a locking member which acts axially or radially between the housing (12) and the measuring chamber (14) for releasable attachment between the housing (12) and the measuring chamber (14) inserted therein.

8. Ionization vacuum measuring cell (10) according to claim 7, wherein the locking member preferably comprises a screw connection, a snap hook connection or a snap ring.

9. Ionization vacuum measuring cell (10) according to claim 1, further comprising a shield (22) disposed upstream in an ionization gas direction of the vacuum-tight feedthrough (20).

10. Ionization vacuum measuring cell (10) according to claim 9 wherein the shield (22) is disposed within the housing (12) such that a substantial portion of the vacuum-tight feedthrough (20) is shielded.

11. Ionization vacuum measuring cell (10) according to claim 10, wherein the shield (22) comprises a baffle designed to substantially deflect particles generated in the measuring chamber.

12. Ionization vacuum measuring cell (10) according to claim 11, wherein the shield (22) is disposed in a section between the measuring chamber (14) and the housing (12) and is formed as a labyrinth path.

13. Ionization vacuum measuring cell (10) according to claim 9, wherein the shield (22) comprises ceramic at least in some sections.

14. Ionization vacuum measuring cell (10) according to claim 9, wherein the shield (22) comprises a baffle designed to substantially deflect particles generated in the measuring chamber.

15. Ionization vacuum measuring cell (10) according to claim 10, wherein the shield (22) comprises ceramic at least in some sections.

16. Ionization vacuum measuring cell (10) according to claim 11,
   wherein the shield (22) comprises ceramic at least in some sections.

17. Ionization vacuum measuring cell (10) according to claim 12, wherein the shield (22) comprises ceramic at least in some sections.

18. The Ionization vacuum measuring cell according to claim 1, wherein the first electrode, which acts as a cathode, has a substantially cylindrical surface and the second electrode, which acts as an anode, is rod shaped and lies on the axis.

* * * * *